United States Patent Office 3,344,113
Patented Sept. 26, 1967

3,344,113
STABILIZED POLYOLEFIN COMPOSITION CONTAINING A MIXTURE OF DILAURYL, DISTEARYL, AND LAURYL STEARYL THIODIPROPIONATES
Robert Jacob Alheim, Middlesex, and Christos Savides, Piscataway Township, N.J., assignors to American Cyanamid Company, Stamford, Conn., a corporation of Maine
No Drawing. Filed Sept. 10, 1964, Ser. No. 395,567
4 Claims. (Cl. 260—45.85)

This invention relates to an improved method for stabilization of polypropylene and, more particularly, to the stabilization of polypropylene with a stabilizer comprising thiodipropionic acid esters of a mixture of lauryl and stearyl alcohols.

The use of an alkyl thiodipropionic ester to stabilize polyolefins such as polyethylene (U.S. Patent No. 2,519,755) is well-known. The dilauryl and the distearyl thiodipropionates have been individually proposed for this purpose and they are the most widely accepted for commercial stabilization of polypropylene. As between the two esters, the distearyl ester has superior activity as a stabilizer. It is characterized by less compatibility in the substrate, and at practical concentrations it shows a tendency to bloom. Conversely, the dilauryl ester is more compatible with polypropylene even at high stabilizer concentrations, but it lacks the high order of activity of the distearyl analog. Thus, the stabilization effect for polypropylene is definitely limited.

The present invention is based on the discovery that the antioxidant activity of a "mixed ester" product is as compatible with polypropylene as the dilauryl ester and has activity at least equal to that of the distearyl ester. Using the mixed ester of this invention in polypropylene, there is no blooming at concentrations where is distearyl ester normally blooms. Thus, the compatibility of the "mixed ester" is equivalent to that of the dilauryl ester, but achieves the antioxidant activity of the distearyl ester.

This result is very surprising since simple physical mixtures of the dilauryl ester and the distearyl ester show less compatibility with polypropylene as compared with mixed ester products having the same lauryl content. It is especially when used in higher concentrations (as 0.75%) that the "mixed ester" excels over the physical mixture in compatibility and, at the same time, stabilizing activity, Heretofore, it was necessary to accept a certain amount of blooming if one desired to use enough ester to give a high of stability to polyofefins. Now it is possible to use enough stabilizer to give desired protection without having to compromise compatibility standards.

The "mixed ester" is not simply a combination of the dilauryl and distearyl esters. It differs from this in also having a significant proportion of lauryl stearyl thiodipropionate. It comprises all three esters, that is the dilauryl ester, the distearyl ester and the lauryl stearyl ester.

The "mixed ester" is used in polyolefins derived from monomers of 2–4 carbons such as polyethylene and especially polypropylene in concentrations of from about 0.2 to 1%. It may be added to the polymer by known milling and blending procedures as will be apparent to one skilled in the art. The polyolefin may have other additives, as are ordinarily encountered, such as other antioxidants of the hindered phenol type, etc.; organic phosphites, light stabilizers, fillers, dyes, etc.

The "mixed ester" can be prepared by esterification of thiodipropionic acid or a precursor thereof such as the dinitrile, the dihalide or an ester of thiodipropionic acid. The alcohol starting material is made up of lauryl and stearyl alcohols in various molar ratios. Thus, the lauryl-stearyl alcohol mixture should contain at least 10% and not more than 90% lauryl alcohol, the remainder being stearyl alcohol. A preferred mixture is one having about equal molar amounts of the alcohols, i.e., 40–60% of the lauryl and 60–40% of the stearyl alcohols. Commercial alcohol mixtures used as starting materials, contain minor amounts of impurities composed of other alcohols of about 10 carbon atoms up to about 20 carbon atoms. However, the presence of such alcohols in the small amounts presents no problems. Conventional esterification methods may be used. However, for practical reasons, it is convenient to react the alcohol mixture directly with 3,3'-dithiodipropionitrile in the presence of an acidic catalyst, e.g., a mineral acid such as hydrochloric, phosphoric, or nitric acid.

The invention is further illustrated by the following examples.

EXAMPLE 1

Preparation of mixed ester-dilauryl, distearyl and lauryl stearyl thiodipropionate from an equimolar mixture of stearyl and lauryl alcohols To a molten mixture of lauryl alcohol (372.6 grams; 2.00 moles) and stearyl alcohol (541.0 grams; 2.00 moles) contained in a 3-liter flask equipped with stirrer thermometer and reflux condenser and maintained at 65–70° C., are added 3,3'-thiodipropionitrile (294.4 grams; 2.10 moles), 35–37% hydrochloric acid (292.0 grams hydrogen chloride; 8.0 moles), and an anti-foaming agent (2 drops). The mixture is stirred at 65–70° C. for two hours, at 85–90° C. for one hour, and at 110–115° C. for five hours under slight reflux.

The reaction mixture is cooled to 97–98° C., diluted with 250 ml. of 97–98° C. water, and the lower aqueous layer decanted and discarded. The residual oil layer is washed twice by decantation using 500-ml. portions of 97–98° C. water.

After adding 50% sulfuric acid (1.5 ml.), the oil is heated at 115–120° C./50 mm. Hg for three hours, and the small amount of aqueous distillate that collects is discarded. The oil is then cooled to 80–85° C., treated with activated carbon (20 grams) at 80–85° C. for 20 minutes, and clarified on a Buchner funnel to give a colorless to pale yellow oil (1,190 grams; 1.99 moles; 99.3% theoretical yield) having a setting point of between 49–52° C.

Other mixed ester products are easily prepared from stearyl-lauryl alcohol mixtures containing 10, 20 and 40 mole percent of lauryl alcohol.

EXAMPLE 2

Films of polypropylene containing the thiodipropionates to be tested were prepared as follows:

The compound was dry-blended with the polypropylene for four hours and milled on a two-roll laboratory mill, by fluxing on the hotter roll (375° F.) for fixe passes. From the milled sheets, a sample of 2 x 2 inches was cut and molded into a film of 12 to 15 mils at 350° F. and 25 tons of pressure.

Individual film samples containing the additives as tabulated below were aged in an air-circulating oven at 140° C. and the time of exposure in the oven until the sample became embrittled was observed.

Compatibility characteristics of the additive were observed by noting blooming on the sample. Blooming is recognized as a cloudy film on the surface. A stabilizer is rated as "poor" if blooming is an easily observable film covering the whole surface of the test sample. A "good" rating is given if only slight, hardly noticeable blooming takes place. A "very good" stabilizer is one which gives rise to no observable blooming.

In Table I are given the data from comparative tests of mixed ester product vs. physical mixture of dilauryl and distearyl esters of thiodipropionic acid (TDP), each having the same lauryl content. In these tests, the stabilizers were used at low concentration levels and only the mixed ester product of this invention gives an acceptable product from the compatibility standpoint, even though both test samples are acceptable as far as stability is concerned.

For high order stability, it is necessary to use high concentrations of stabilizer. The compatibility of the mixed ester product of this invention far surpasses that of the corresponding physical mixture. To take full advantage of this invention, it is desirable that the lauryl and stearyl esterifying moieties be present in an approximately equimolar amount. At very high concentrations in polypropylene, even some of the products of this invention tend to bloom, i.e., those having low proportions of lauryl moieties. However, the esterification product from an equimolar mixture of alcohols is excellent in this regard. The physical mixture of even equimolar amounts of DLTDP and DSTDP blooms badly.

This can be seen from the following Table II.

TABLE II

| Sample | Stabilizer | Conc. In Polypropylene (Percent) | Oven-Aging 140° C. Brittle Point (Hrs.) | Compatibility |
| --- | --- | --- | --- | --- |
| 1 | TDP esters having 50 mole percent lauryl moiety | 0.75 | 780 | Very good. |
| 2 | Physical mixture of equimolar DLTDP and DSTDP. | 0.75 | 750 | Poor. |

We claim:

1. A composition capable of stabilizing a polymer of a mono-alpha-olefin of 2–4 carbons, comprising a mixture of dilauryl, distearyl and lauryl stearyl thiodipropionates wherein the lauryl moiety constitutes from 10–90 mole percent of the total ester moieties, the mixture being characterized by a weight percent of lauryl stearyl thiodipropionate substantially the same as the weight percent of the latter in any esterification product resulting from the reaction of thiodipropionic acid with a stoichiometric amount of a mixture of lauryl and stearyl alcohols having between about 10 and 90 percent lauryl alcohol.

2. The composition of claim 1 wherein the lauryl moiety constitutes 50 mole percent of the ester moieties.

3. A composition comprising a polymer of a 2–4 carbon mono-alpha-olefin and 0.2 to 1.0 weight percent of a stabilizer comprising a mixture of dilauryl, distearyl and lauryl stearyl thiodipropionates wherein the lauryl moiety constitutes from 10–90 mole percent of the total ester moieties, the mixture being characterized by a weight percent of lauryl stearyl thiodipropionate substantially the same as the weight percent of the latter in any esterification product resulting from the reaction of thiodipropionic acid with a stoichiometric amount of a mixture of lauryl and stearyl alcohols having between about 10 and 90 percent lauryl alcohol.

4. A composition comprising polypropylene and 0.2 to 1.0 weight percent of a mixed thiodipropionate of claim 1 derived from an equimolar mixture of lauryl and stearyl alcohols.

TABLE I

| Sample | Stabilizer | Conc. In Polypropylene (Percent) | Oven-Aging 140° C. Brittle Point (Hrs.) | Compatibility |
| --- | --- | --- | --- | --- |
| 1 | TDP esters having 10 mole percent lauryl moiety | 0.35 | 330 | Good. |
| 2 | Physical mixture 10 mole percent DLTDP [1] and 90 mole percent DSTDP.[2] | 0.35 | 315 | Poor. |

[1] DLTDP is dilauryl thiodipropionate.
[2] DSTDP is distearyl thiodipropionate.

(References on following page)

References Cited

UNITED STATES PATENTS

| | | | |
|---|---|---|---|
| 3,038,878 | 6/1962 | Bell et al. | 260—45.85 |
| 3,255,136 | 6/1966 | Hecker et al. | 260—45.85 |

FOREIGN PATENTS

| | | |
|---|---|---|
| 683,004 | 3/1964 | Canada. |
| 686,360 | 5/1964 | Canada. |
| 936,494 | 9/1963 | Great Britain. |

DONALD E. CZAJA, *Primary Examiner.*

LEON J. BERCOVITZ, *Examiner.*

G. W. RAUCHFUSS, V. P. HOKE, *Assistant Examiners.*

UNITED STATES PATENT OFFICE
CERTIFICATE OF CORRECTION

Patent No. 3,344,113                          September 26, 1967

Robert Jacob Alheim et al.

It is hereby certified that error appears in the above numbered patent requiring correction and that the said Letters Patent should read as corrected below.

Column 1, line 36, for "is", second occurrence, read -- the --; column 2, line 63, for "fixe" read -- five --; column 4, TABLE II, second column, line 1 thereof, for "layryl" read -- lauryl --.

Signed and sealed this 18th day of February 1969.

(SEAL)
Attest:

Edward M. Fletcher, Jr.                       EDWARD J. BRENNER
Attesting Officer                             Commissioner of Patents